United States Patent
Thompson

(10) Patent No.: US 10,119,705 B2
(45) Date of Patent: Nov. 6, 2018

(54) WATER/FUEL RATIO CONTROL USING COMPLEMENTARY FILTERING BETWEEN VALVE AND FLOWMETER FEEDBACK SIGNALS

(71) Applicant: United Technologies Corporation, Hartford, CT (US)

(72) Inventor: Andrew B. Thompson, East Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 294 days.

(21) Appl. No.: 15/130,739

(22) Filed: Apr. 15, 2016

(65) Prior Publication Data
US 2017/0299191 A1    Oct. 19, 2017

(51) Int. Cl.
| | |
|---|---|
| F23R 3/36 | (2006.01) |
| F23D 99/00 | (2010.01) |
| F23N 1/00 | (2006.01) |
| F23R 3/28 | (2006.01) |
| G05B 15/02 | (2006.01) |
| F02M 25/022 | (2006.01) |
| G05D 11/13 | (2006.01) |

(52) U.S. Cl.
CPC .......... *F23R 3/36* (2013.01); *F02M 25/0227* (2013.01); *F23D 91/00* (2015.07); *F23N 1/002* (2013.01); *F23R 3/28* (2013.01); *G05B 15/02* (2013.01); *G05D 11/132* (2013.01)

(58) Field of Classification Search
None
See application file for complete search history.

(56) References Cited

U.S. PATENT DOCUMENTS

| | | | |
|---|---|---|---|
| 4,805,571 A | 2/1989 | Humphrey | |
| 2005/0192727 A1* | 9/2005 | Shostak | B60C 11/24 701/37 |
| 2012/0110985 A1* | 5/2012 | McCombs | F01N 3/025 60/287 |
| 2014/0330469 A1* | 11/2014 | Yoshida | B60W 10/06 701/22 |

FOREIGN PATENT DOCUMENTS

WO    9203771    3/1992

OTHER PUBLICATIONS

EP Search Report dated Sep. 20, 2017 in EP Application No. 17166919.5.

* cited by examiner

*Primary Examiner* — Tuan C Dao
(74) *Attorney, Agent, or Firm* — Snell & Wilmer L.L.P.

(57) ABSTRACT

Systems and methods for use with water-fuel supply to industrial engines are provided. A method for controlling water supplied to an engine may include using both a desired water-fuel ratio, and a compensated fuel flow. This compensated fuel flow may be calculated by a controller-implemented complementary filter, which may include receiving, by the controller, a first signal and a second signal. The complementary filter may subtract the second signal from the first signal to create an error signal, lag the error signal to create a lagged error signal, and add the lagged error signal to the second signal to create a compensated signal. The controller may calculate a water flow request using a desired water-fuel ratio and the compensated signal.

12 Claims, 4 Drawing Sheets

WATER/FUEL RATIO CONTROL USING COMPLEMENTARY FILTERING BETWEEN VALVE AND FLOWMETER FEEDBACK SIGNALS

FIELD

The present disclosure relates to systems and methods for engine control, and, more specifically, to systems and methods for managing water-fuel ratio in an industrial engine or generator.

BACKGROUND

An industrial engine arrangement can include a control system, a fuel supply, a water supply, and a number of valves and meters between each of the fuel and water supplies and the engine. The fuel and water may be mixed to form a water-fuel mixture with a desired water fuel ratio. This water-fuel ratio may be tailored for reducing carbon emissions in the engine exhaust, while ensuring sufficient fuel to maintain a stable combustor flame. Generally, the control system may control the valves to mix the water and the fuel at a desired water-fuel ratio in an open-loop or closed-loop manner for supply to the engine.

SUMMARY

The present disclosure is related to systems and methods for controlling water-fuel ratio supplied to an engine. A water-fuel ratio control may comprise both a method of determining the actual fuel supplied to an engine as well as a method for scheduling a desired water flow rate. A method for determining fuel supplied to an engine may comprise receiving, by a controller, a first signal, receiving, by the controller, a second signal, wherein a response bandwidth frequency of the first signal is less than the response bandwidth frequency of the second signal, subtracting, by the controller, the second signal from the first signal to create an error signal, lagging, by the controller, the error signal to create a lagged error signal, adding, by the controller, the lagged error signal to the second signal to create a compensated signal, receiving, by the controller, a switch control signal, the compensated signal, and the second signal, determining, by the controller, the controller implementing a switch logic, whether to send at least one of the compensated signal or the second signal, calculating, by the controller, a water flow request, wherein the calculating is performed using a desired water-fuel ratio and the at least one of the compensated signal or the second signal, and sending, by the controller, the water flow request to a water control system.

In various embodiments, the lagging the error signal may be performed using a first-order filter utilizing a time constant. The first signal may be received by the controller from a fuel flowmeter. The second signal may be received by the controller from a fuel valve. The water flow request may be used to at least one of open or close a water valve. The controller may determine to send the second signal in response to at least one of the time constant comprising a value of less than or equal to zero or a reset signal being true.

A water-fuel control system for an engine may comprise a controller, the controller implementing a complementary filter, configured to receive a first signal and a second signal, wherein a response bandwidth frequency of the first signal is less than the response bandwidth frequency of the second signal, calculate an error signal using the first signal and the second signal, lag the error signal to create a lagged error signal, add the lagged error signal and the second signal to create a compensated signal, receive a switch control signal, the compensated signal, and the second signal, determine the controller implementing a switch logic, whether to send at least one of the compensated signal or the second signal, calculate a water flow request, wherein the calculating is performed using a desired water-fuel ratio and the at least one of the compensated signal or the second signal, and send the water flow request to a water control system.

In various embodiments, the lagging the error signal may be performed using a first-order filter utilizing a time constant. The first signal may comprise a low frequency signal relative to the second signal and the second signal comprises a high frequency signal relative to the first signal. The error signal may be calculated by subtracting the second signal from the first signal. The first signal may be based upon a fuel flow rate determined by a flowmeter and the second signal may be based upon a fuel valve position. The water flow request may be used to at least one of open or close a water valve. The switch control signal may be true in response to at least one of a reset signal being true or the time constant comprising a non-positive value. The switch control signal may be false in response to both the reset signal being false and the time constant comprising a positive value. The controller may send the compensated signal in response to the switch control signal being false and wherein the controller sends the second signal in response to the switch control signal being true.

A control method for scheduling water supplied to an engine may comprise filtering, by a controller, an error between a low frequency signal received from a fuel flowmeter and a high frequency signal received from a fuel valve, calculating, by the controller, a compensated fuel flow rate, multiplying, by the controller, the compensated fuel flow rate with a desired water-fuel ratio to determine a desired water flow rate, and sending, by the controller, the desired water flow rate to a water control system to control a flow rate of a water supply being supplied to the engine.

In various embodiments, the filtering may be performed by a first-order, complementary filter. The first-order, complementary filter may be configured to receive the low frequency signal and the high frequency signal, and lag the error between the low frequency signal and the high frequency signal to create a lagged error signal, and add the lagged error signal to the high frequency signal to create the compensated fuel flow rate. The filtering may comprise lagging the error between the low frequency signal and the high frequency signal to generate a lagged error signal, and the calculating comprises adding the lagged error signal to the high frequency signal. A response bandwidth frequency of the low frequency signal may be between 0.001 Hz and 1 Hz and the response bandwidth frequency of the high frequency signal may be between 0.1 Hz and 10 Hz.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

Figure 1:
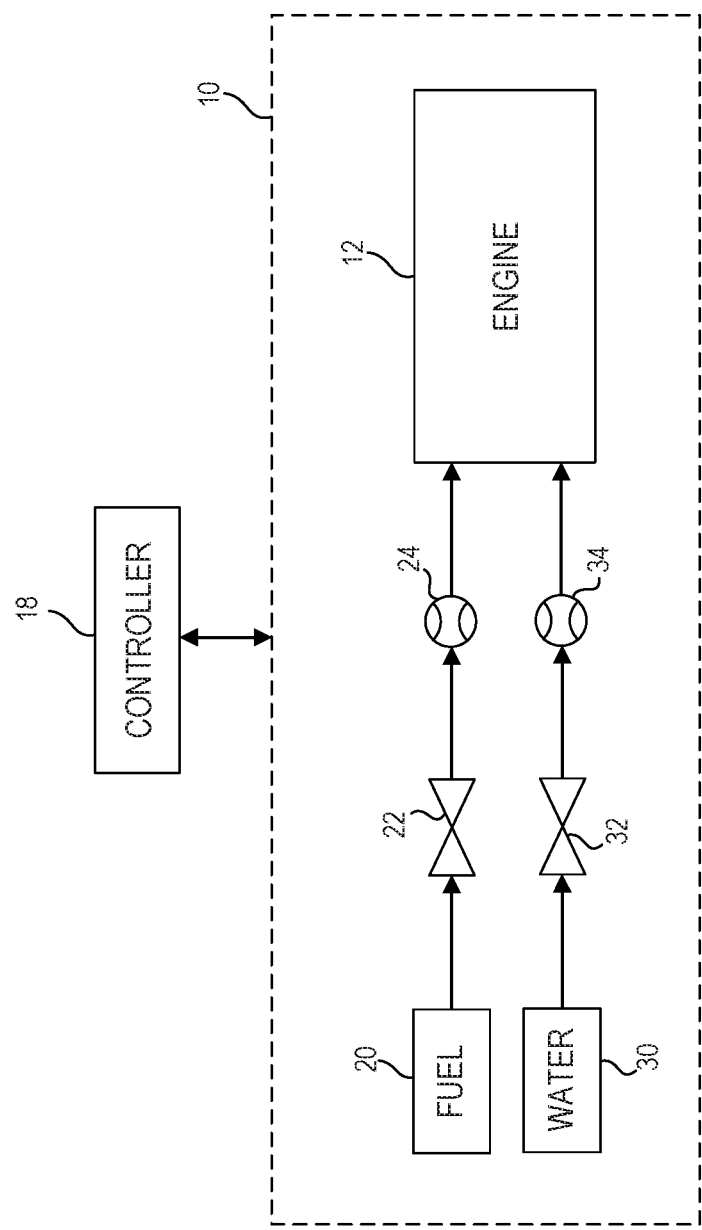
- FIG. 1 illustrates a schematic view of an engine arrangement in communication with a controller, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

In various embodiments, the open-loop water-fuel control system as disclosed herein includes a controller in communication with a fuel valve and a fuel flowmeter. The water-fuel control system is capable of varying the supply rate of water for mixing with a fuel in response to a measured, filtered signal. The controller may receive a high frequency signal from the fuel valve. The controller may receive a low frequency signal from the fuel flowmeter. The fuel valve signal may correspond to a fuel valve position. The fuel flowmeter signal may be based on a fuel flow rate. A complementary filter may subtract the high frequency signal from the low frequency signal to generate an error signal. The complementary filter may lag the error signal using a first-order filter with a given time constant. This lagged error signal may then be added to the high frequency signal to generate a new compensated signal. In this manner, the error between the low frequency and high frequency signals may be filtered for use with the high frequency fuel valve signal to properly determine a fast and accurate fuel flow rate. The new compensated signal may be used to determine the desired supply rate of water for mixing with the current amount of fuel. In this regard, the water can be controlled using a fuel flow rate that is both accurate and responsive. Furthermore, accurate and responsive water control may aide in accurately limiting the water-fuel ratio, and prevents the water-fuel ratio from exceeding certain thresholds to avoid risk of combustor flameout.

With reference to FIG. 1, an engine arrangement 10 is schematically illustrated, in accordance with various embodiments. Engine arrangement 10 may include engine 12, fuel supply 20, and water supply 30. Engine 12 may comprise an industrial engine such as a power generator, for example. Engine 12 may include a burner configured to receive a water-fuel mixture. Thus, engine 12 may receive water and fuel for combustion.

Fuel supply 20 may comprise a container for supplying fuel to engine 12. Fuel supply 20 may be pressurized. A fuel valve 22 may be located between fuel supply 20 and engine 12. Stated another way, fuel supply 20 may be fluidly coupled to engine 12 via fuel valve 22. Fuel valve 22 may meter the flow of fuel from fuel supply 20 to engine 12. Fuel valve 22 may meter the rate at which fuel flows from fuel supply 20 to engine 12. In various embodiments, fuel valve 22 may comprise a fuel modulating valve or a fuel modulating unit.

Water supply 30 may comprise a container for supplying water to engine 12. Water supply 30 may be pressurized. A water valve 32 may be located between water supply 30 and engine 12. Stated another way, water supply 30 may be fluidly coupled to engine 12 via water valve 32. Water valve 32 may meter the flow of water from water supply 30 to engine 12. In various embodiments, water valve 32 may be similar to fuel valve 22.

A fuel flowmeter 24 may be located between fuel supply 20 and engine 12. Stated another way, fuel supply 20 may be fluidly coupled to engine 12 via fuel flowmeter 24. Fuel flowmeter 24 may be located between fuel valve 22 and engine 12. Fuel flowmeter 24 may measure a rate of flow of fuel from fuel supply 20 to engine 12. In this manner a fuel flow rate may be measured by fuel flowmeter 24. In various embodiments, fuel flowmeter 24 may measure a mass flow rate of fuel from fuel supply 20 to engine 12. Thus, the units of the mass flow rate may be in pounds per hour, pounds per second, or the like.

A water flowmeter 34 may optionally be located between water supply 30 and engine 12. Stated another way, water supply 30 may be fluidly coupled to engine 12 via water flowmeter 34. Water flowmeter 34 may be located between water valve 32 and engine 12. Water flowmeter 34 may measure a rate of flow of water from water supply 30 to engine 12. In this manner a water flow rate may be measured by water flowmeter 34. In various embodiments, water flowmeter 34 may measure a mass flow rate of water from water supply 30 to engine 12.

Engine arrangement 10 may further include controller 18. Controller 18 may comprise a filter as will become apparent in the description of FIG. 2 herein. Controller 18 may be in communication (e.g., electrical communication) with engine arrangement 10. In various embodiments, fuel valve 22 may be a controllable valve. Stated another way, a controller (i.e., controller 18) may control the position of fuel valve 22. For example, controller 18 may open and/or close fuel valve 22. Similarly, water valve 32 may be a controllable valve. A controller (i.e., controller 18) may control the position of water valve 32. In this regard, fuel valve 22 may comprise a valve assembly comprising a valve and an actuation device which receives input from controller 18, wherein the actuation device actuates (i.e., opens and/or closes) based upon the input. Water valve 32 may be similar to fuel valve 22.

Figure 2:
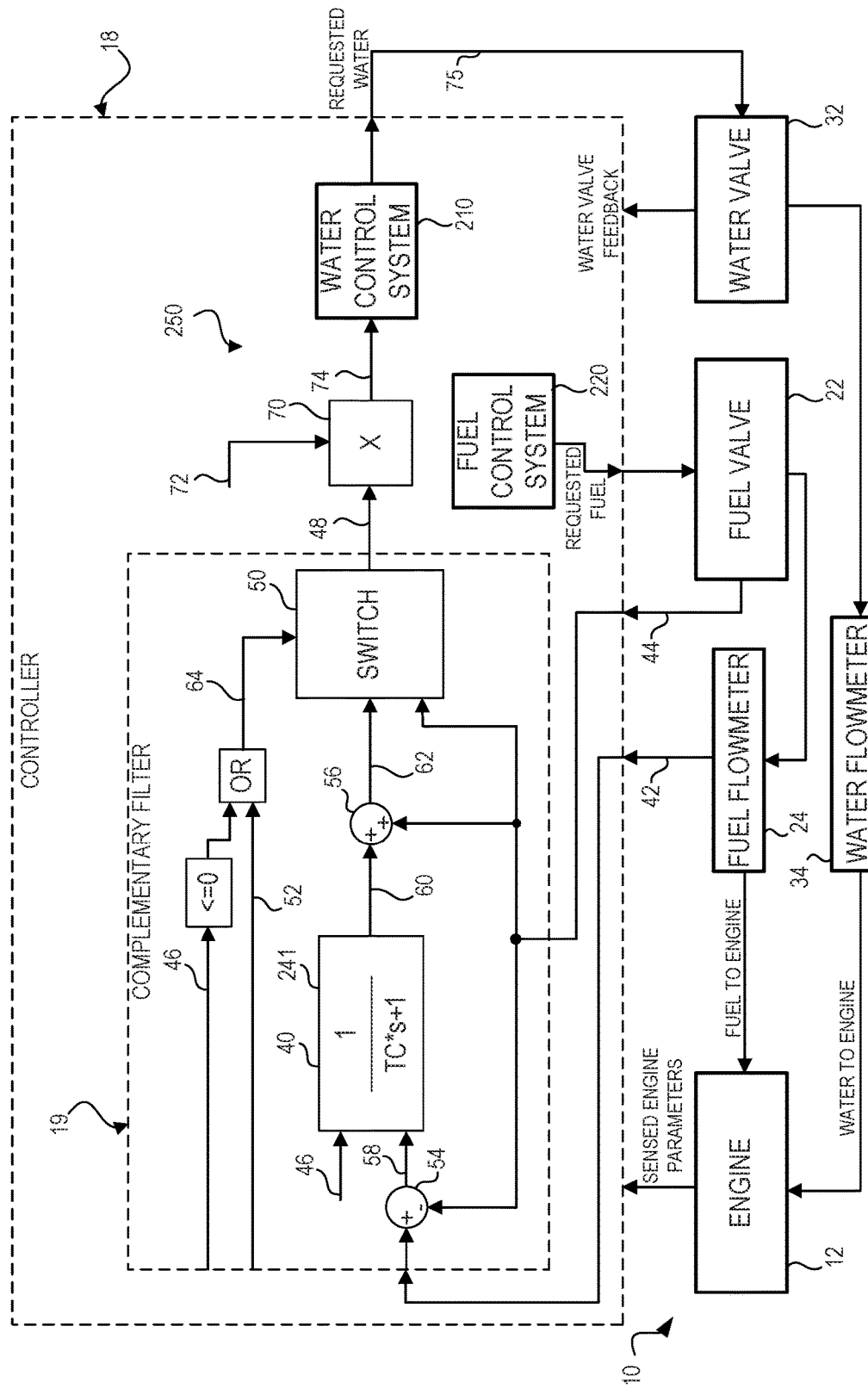
FIG. 2 illustrates a schematic view of a controller in communication with an engine arrangement, in accordance with various embodiments.

With respect to FIG. 2, elements with like element numbering, as depicted in FIG. 1, are intended to be the same and will not necessarily be repeated for the sake of clarity.

With reference to FIG. 2, a schematic view of controller 18 in communication with engine arrangement 10 is illustrated, in accordance with various embodiments. In various embodiments, controller 18 may comprise a complementary filter 19. As used herein, the term "complementary filter" may refer to a first-order filter configured to combine a high frequency signal with a low frequency signal. In various embodiments, controller 18 may receive first signal 42 and a second signal 44. In various embodiments, first signal 42 may comprise a low frequency signal. In various embodiments, a low frequency signal may be a signal comprising a response bandwidth frequency which is lower than the response bandwidth frequency of second signal 44. First signal 42 may be received by controller 18 from fuel flowmeter 24 (see FIG. 1). In various embodiments, second signal 44 may comprise a high frequency signal. In various embodiments, a high frequency signal may be a signal comprising a response bandwidth frequency higher than the response bandwidth frequency of first signal 42. In various embodiments, first signal 42 may comprise a response bandwidth frequency of between 0.001 Hz and 1 Hz and, in various embodiments, may comprise a response bandwidth frequency of between 0.1 Hz and 0.5 Hz. In various embodiments, second signal 44 may comprise a response bandwidth frequency of between 0.1 Hz and 10 Hz and, in various embodiments, may comprise a response bandwidth frequency of between 4 Hz and 6 Hz. Second signal 44 may be received by controller 18 from fuel valve 22 (see FIG. 1).

In various embodiments, filter 19 may include first summing node 54. First summing node 54 may subtract second signal 44 from first signal 42 to calculate or generate error signal 58. Lag logic 40 may receive error signal 58. Lag logic 40 may receive time constant 46. In various embodiments, lag logic 40 may lag error signal 58 via a first-order filtering equation as provided in FIG. 2. Thus, lag logic 40 may comprise first-order filter 241. Lag logic 40 may lag error signal 58 using first-order filter 241 having time constant (also illustrated as TC in FIG. 2) 46 to create lagged error signal 60. Time constant 46 may comprise a predetermined duration of time. Stated another way, time constant 46 may comprise a value of time, in units of seconds for example. Second summing node 56 may add lagged error signal 60 to second signal 44 to create compensated signal (also referred to herein as compensated fuel flow rate) 62. In various embodiments, compensated signal 62 may be based upon a fuel valve position and/or a measured fuel flow rate.

Switch logic 50 may receive compensated signal 62, second signal 44, and switch control signal 64. Switch control signal 64 may be a signal for controlling switch logic 50. Switch control signal 64 may determine if switch logic 50 outputs compensated signal 62 or second signal 44. Switch control signal 64 may be determined based upon reset signal 52 or time constant 46. Reset signal 52 may be received by controller 18. Reset signal 52 may be a signal for resetting filter 19. For example, reset signal 52 may be true in response to a system rebooting or in response to a component failure. Switch control signal 64 may be true in response to reset signal 52 being true. Switch control signal 64 may be true in response to time constant 46 comprising a non-positive value. Conversely, switch control signal 64 may be false in response to both reset signal 52 being false and time constant 46 comprising a positive value. In this regard, switch logic 50 may output compensated signal 62 in response to switch control signal 64 being false. Thus, new signal 48 may comprise compensated signal 62. Conversely, switch logic may output second signal 44 in response to switch control signal 64 being true. Thus, new signal 48 may comprise second signal 44. Controller 18 may then send new signal 48 for use by further systems, as will become apparent herein.

Controller 18 may include logic (also referred to herein as calculator) 70. Calculator 70 may comprise a logic configured to calculate a water flow rate. Switch logic 50 may send new signal 48 to calculator 70. Thus, calculator 70 may receive new signal 48. Calculator 70 may receive water-fuel ratio 72. Water-fuel ratio 72 may be the desired ratio of water and fuel to be supplied to engine 12. Calculator 70 may multiply water-fuel ratio 72 with new signal 48 to calculate water signal (also referred to herein as water flow request or a desired water flow rate) 74. For example, if water-fuel ratio 72 is one and one half (1.5) and new signal 48 comprises a value of three (3), then water signal 74 would comprise a value of four and one half (4.5).

Water signal 74 may be sent to water control system 210. Water control system 210 may send a water request signal 75 to water valve 32. Water request signal 75 may be similar to water signal 74. Thus, water request signal 75 may correspond to a requested or a desired water flow rate (i.e., the flow rate of water through water flowmeter 34). Similarly, water request signal 75 may correspond to a valve position (i.e., the position of water valve 32). In this manner, the position of water valve 32 may be controlled in an open-loop manner, with respect to fuel, by multiplying a desired water-fuel ratio with fuel feedback. Calculator 70 and water control system 210 may be collectively referred to as a water-fuel ratio system 250. Thus, the new signal 48 may be sent to water-fuel ratio system 250 for use in scheduling water to be sent to engine 12.

In various embodiments, fuel control system 220 may include fuel valve 22. Fuel control system 220 may include other members for controlling the fuel system such as valves, meters, sensors, etc., for example. In various embodiments, water control system 210 may include water valve 32. Water control system 210 may include other members for controlling the water system such as valves, meters, sensors, etc., for example.

Figure 3:
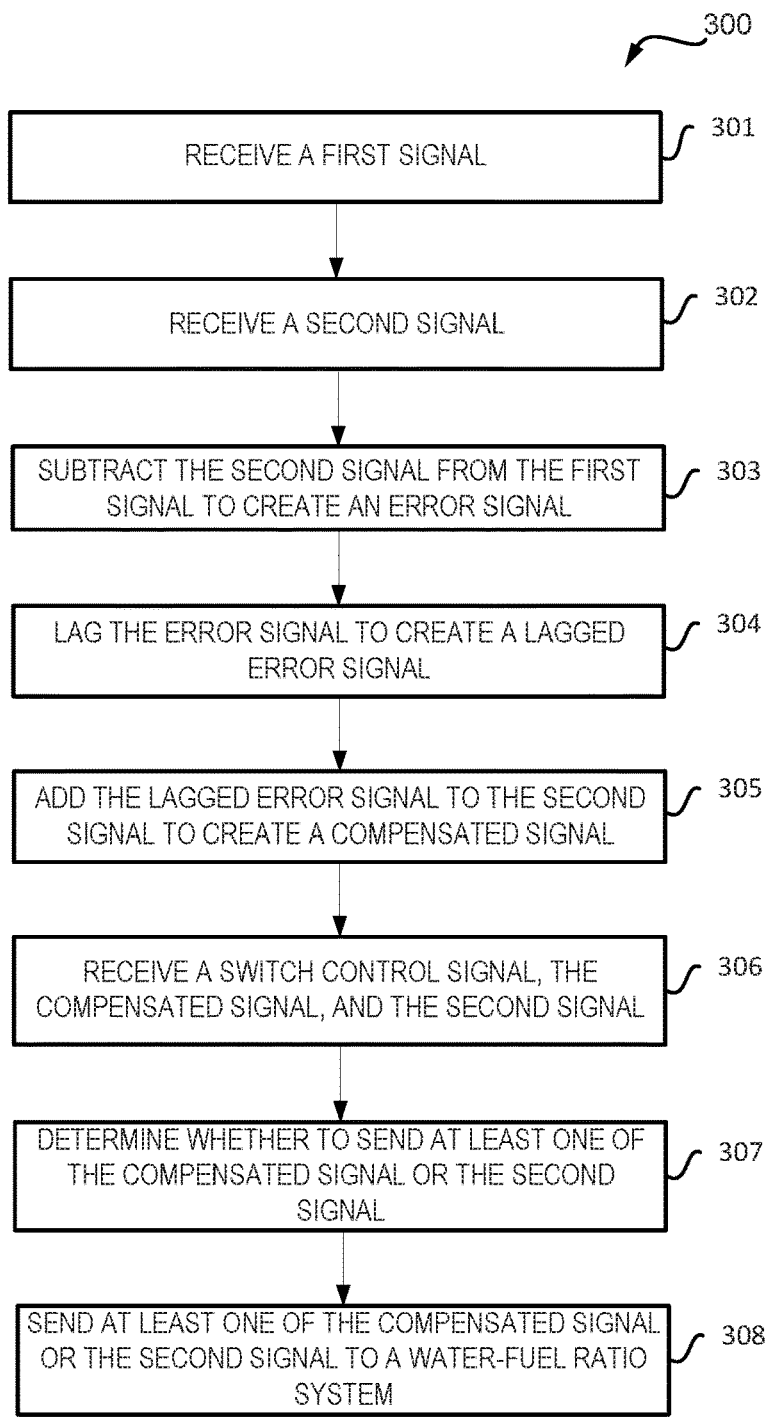
FIG. 3 illustrates a method for determining fuel supplied to an engine, in accordance with various embodiments.

With reference to FIG. 3, a method 300 for determining fuel supplied to an engine is illustrated, in accordance with various embodiments. Although a control system may command a certain flow rate of fuel to an engine, the actual fuel flow rate may be slightly different than the commanded fuel flow rate due to system limitations. In this regard, method 300 may be for determining the actual flow rate of fuel supplied to an engine, as opposed to the commanded flow rate of fuel to be supplied to the engine. Method 300 may include receiving a first signal (see step 301). Method 300 may include receiving a second signal (see step 302). Method 300 may include subtracting the second signal from the first signal to create an error signal (see step 303). Method 300 may include lagging the error signal to create a lagged error signal (see step 304). Method 300 may include adding the lagged error signal to the second signal to create a compensated signal (see step 305). Method 300 may include receiving a switch control signal, the compensated signal, and the second signal (see step 306). Method 300 may include determining whether to send at least one of the compensated signal or the second signal (see step 307). Method 300 may include sending at least one of the compensated signal or the second signal to a water-fuel ratio system (see step 308).

In various embodiments, with reference to FIG. 2, and FIG. 3, step 301 may include receiving, by controller 18, first signal 42. Step 302 may include receiving, by controller 18, second signal 44. Step 303 may include subtracting, by controller 18, second signal 44 from first signal 42 to create error signal 58. Step 304 may include lagging, by controller 18, error signal 58 using time constant 46 to create lagged error signal 60. Step 305 may include adding, by controller 18, lagged error signal 60 and second signal 44 to create compensated signal 62. Step 306 may include receiving, by switch logic 50, switch control signal 64, compensated signal 62, and second signal 44. Step 307 may include determining, by controller 18, the controller implementing switch logic 50, whether to send at least one of the compensated signal 62 or the second signal 44. Step 308 may include sending, by controller 18, at least one of the compensated signal 62 or the second signal 44 (i.e., new signal 48) to a water-fuel ratio system (i.e., water-fuel ratio system 250).

Figure 4:
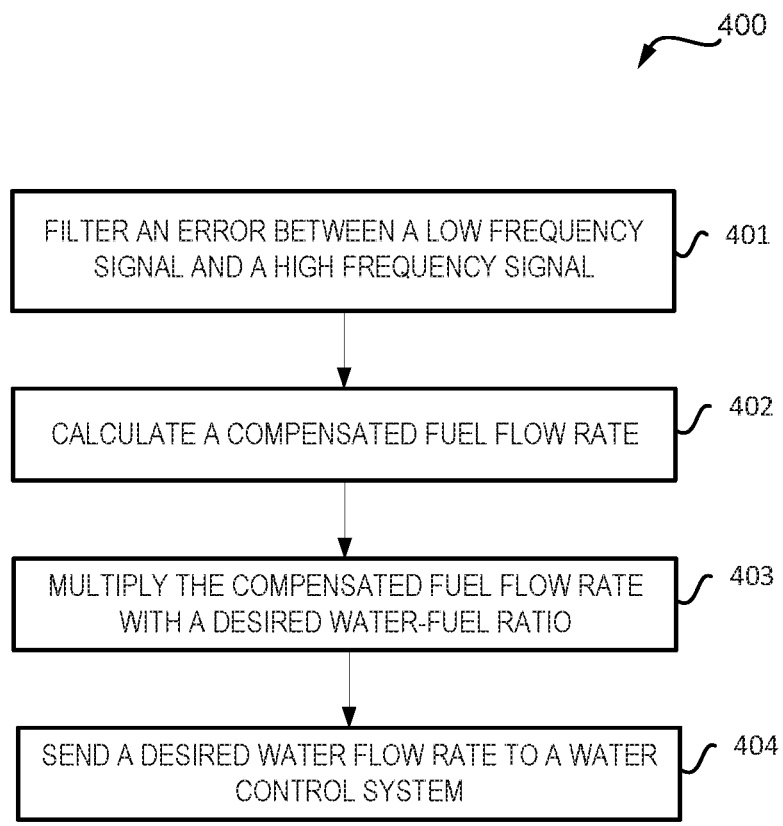
FIG. 4 illustrates a method for scheduling water supplied to an engine, in accordance with various embodiments.

With reference to FIG. 4, a method 400 for scheduling water supplied to an engine is illustrated, in accordance with various embodiments. Method 400 may include filtering an error between a low frequency signal and a high frequency signal (see step 401). Method 400 may include calculating a compensated fuel flow rate (see step 402). Method 400 may include multiplying the compensated fuel flow rate with a desired water-fuel ratio (see step 403). Method 400 may include sending a desired water flow rate to a water control system (see step 404).

In various embodiments, with reference to FIG. 2 and FIG. 4, step 401 may include filtering error signal 58, using filter 19, to determine compensated fuel flow rate 62. Step 403 may include calculating compensated fuel flow rate 62. Step 403 may include multiplying compensated fuel flow rate 62 with desired water-fuel ratio 72 to determine a water flow rate (i.e., water signal 74). Step 404 may include sending water signal 74 to water control system 210.

Although described herein as being implemented on controller 18, it is contemplated that filter 19 may be implemented on one or more controllers and in any combination thereof.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for determining fuel supplied to an engine comprising:
   receiving, by a controller, a first signal;
   receiving, by the controller, a second signal, wherein a response bandwidth frequency of the first signal is less than the response bandwidth frequency of the second signal;
   subtracting, by the controller, the second signal from the first signal to create an error signal;
   lagging, by the controller, the error signal to create a lagged error signal using a first-order filter utilizing a time constant;
   adding, by the controller, the lagged error signal to the second signal to create a compensated signal;
   receiving, by the controller, a switch control signal, the compensated signal, and the second signal;
   determining, by the controller, the controller implementing a switch logic, whether to send at least one of the compensated signal or the second signal;
   sending, by the controller, at least one of the compensated signal or the second signal to a water-fuel ratio system.

2. The method of claim 1, wherein the first signal is received by the controller from a fuel flowmeter.

3. The method of claim 2, wherein the second signal is received by the controller from a fuel valve.

4. The method of claim 3, wherein the controller determines to send the second signal in response to at least one of the time constant comprising a value of less than or equal to zero or a reset signal being true.

5. A water-fuel control system for an engine comprising:
a controller, the controller implementing a complementary filter, configured to:
- receive a first signal and a second signal, wherein a response bandwidth frequency of the first signal is less than the response bandwidth frequency of the second signal;
- calculate an error signal using the first signal and the second signal;
- lag the error signal to create a lagged error signal;
- add the lagged error signal and the second signal to create a compensated signal;
- receive a switch control signal, the compensated signal, and the second signal;
- determine the controller implementing a switch logic, whether to send at least one of the compensated signal or the second signal;
- calculate a water flow request, wherein the calculating is performed using a desired water-fuel ratio and the at least one of the compensated signal or the second signal; and
- send the water flow request to a water control system, wherein the water flow request is used to at least one of open or close a water valve.

6. The water-fuel control system of claim 5, wherein the lagging the error signal is performed using a first-order filter utilizing a time constant.

7. The water-fuel control system of claim 6, wherein the first signal comprises a low frequency signal relative to the second signal and the second signal comprises a high frequency signal relative to the first signal.

8. The water-fuel control system of claim 7, wherein the error signal is calculated by subtracting the second signal from the first signal.

9. The water-fuel control system of claim 8, wherein the first signal is based upon a fuel flow rate determined by a flowmeter and the second signal is based upon a fuel valve position.

10. The water-fuel control system of claim 9, wherein the switch control signal is true in response to at least one of a reset signal being true or the time constant comprising a non-positive value.

11. The water-fuel control system of claim 10, wherein the switch control signal is false in response to both the reset signal being false and the time constant comprising a positive value.

12. The water-fuel control system of claim 11, wherein the controller sends the compensated signal in response to the switch control signal being false and wherein the controller sends the second signal in response to the switch control signal being true.

* * * * *